United States Patent
Bienek et al.

(10) Patent No.: US 11,708,100 B2
(45) Date of Patent: Jul. 25, 2023

(54) DETECTING AND OPTIMIZING THE STOPPING-POINT ACCURACY OF A VEHICLE

(71) Applicant: SIEMENS MOBILITY GMBH, Munich (DE)

(72) Inventors: Frank Bienek, Wolfenbuettel (DE); Volker Knollmann, Braunschweig (DE); Bernhard Poesel, Koenigslutter (DE); Gerd Tasler, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 367 days.

(21) Appl. No.: 16/649,419

(22) PCT Filed: Aug. 21, 2018

(86) PCT No.: PCT/EP2018/072523
§ 371 (c)(1),
(2) Date: Mar. 20, 2020

(87) PCT Pub. No.: WO2019/057421
PCT Pub. Date: Mar. 28, 2019

(65) Prior Publication Data
US 2020/0283039 A1 Sep. 10, 2020

(30) Foreign Application Priority Data
Sep. 21, 2017 (DE) .............................. 102017216712

(51) Int. Cl.
*B61L 25/02* (2006.01)
*B61L 3/00* (2006.01)
(Continued)

(52) U.S. Cl.
CPC ............. *B61L 25/025* (2013.01); *B61L 3/008* (2013.01); *B60L 2200/26* (2013.01); *B61L 3/006* (2013.01);
(Continued)

(58) Field of Classification Search
CPC ...... B61L 25/025; B61L 25/026; B61L 3/006; B61L 3/008; B61L 23/00
See application file for complete search history.

(56) References Cited

U.S. PATENT DOCUMENTS 9,975,488 B2   5/2018 Fukushima
10,023,162 B2 * 7/2018 Shiratsuchi .............. B60T 7/18
(Continued)

FOREIGN PATENT DOCUMENTS

CN   102167064 A   8/2011
CN   102177061 A   9/2011
(Continued)

*Primary Examiner* — Tarek Elarabi
(74) *Attorney, Agent, or Firm* — Laurence A. Greenberg; Werner H. Stemer; Ralph E. Locher

(57) ABSTRACT

An apparatus for sensing and optimizing the stopping-point accuracy of a vehicle. The apparatus includes at least one sensor unit, which can be arranged on the vehicle, and at least one evaluation unit connected to the sensor unit. The at least one sensor unit is configured to measure a distance relative to a gap profile arranged at a stopping point to which the vehicle travels and to transmit the measurement result to the evaluation unit connected to the sensor unit. There is also described a corresponding system including the apparatus and the distance profile, and also a vehicle with such an apparatus.

13 Claims, 4 Drawing Sheets

(51) Int. Cl.
*B61L 23/00* (2006.01)
*B61L 27/20* (2022.01)

(52) U.S. Cl.
CPC ............ *B61L 23/00* (2013.01); *B61L 25/026* (2013.01); *B61L 2027/204* (2022.01)

(56) References Cited

U.S. PATENT DOCUMENTS

| | | |
|---|---|---|
| 2011/0184621 A1 | 7/2011 | Bock et al. |
| 2011/0234451 A1* | 9/2011 | Bock ..................... G01S 13/88 342/109 |
| 2017/0305396 A1 | 10/2017 | Shiratsuchi |
| 2018/0037243 A1* | 2/2018 | Danielson ........... B60W 30/146 |

FOREIGN PATENT DOCUMENTS

| | | |
|---|---|---|
| CN | 202022221 U | 11/2011 |
| CN | 104540719 A | 4/2015 |
| CN | 106414154 A | 2/2017 |
| DE | 102011088891 A1 | 6/2013 |
| DE | 102012219901 A1 | 4/2014 |
| DE | 102013219805 A1 | 4/2015 |
| DE | 102014221710 A1 | 4/2016 |
| EP | 2316706 A1 | 5/2011 |
| GB | 2424288 A | 9/2006 |
| JP | H06335117 A | 12/1994 |
| JP | 2014202527 A | 10/2014 |
| JP | 6000488 B1 | 9/2016 |
| RU | 2618569 C1 | 5/2017 |
| WO | WO 0166401 A1 | 9/2001 |
| WO | WO 2010040654 A1 | 4/2010 |
| WO | WO 2016035597 A1 | 3/2016 |

\* cited by examiner

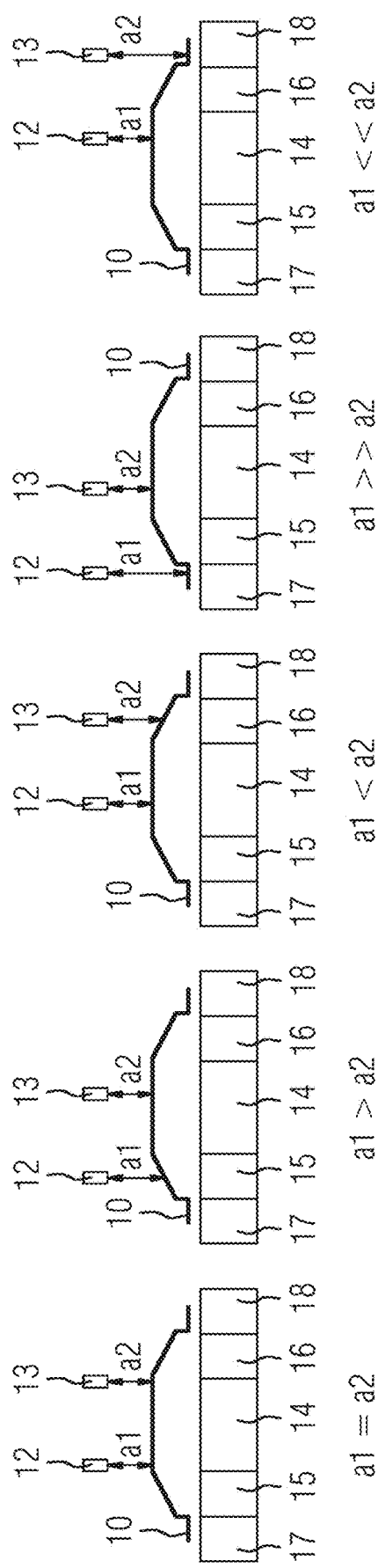
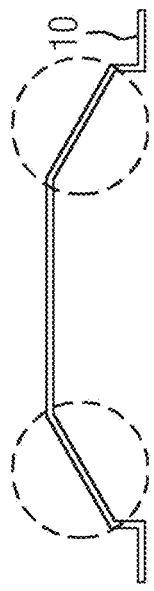
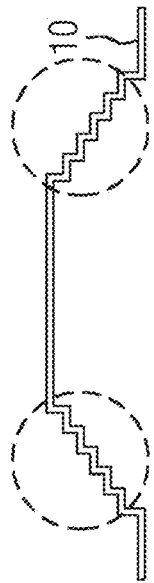

DETECTING AND OPTIMIZING THE STOPPING-POINT ACCURACY OF A VEHICLE

BACKGROUND OF THE INVENTION

Field of the Invention

The present invention relates to a system for detecting and optimizing the stopping point accuracy of a vehicle.

The operation of rail-bound traffic systems is becoming increasingly automated, which by way of example is apparent in the use of driverless systems in metros or subways. During the course of this automation, in particular in the field of local transport systems, it is also necessary to protect the passengers on the platform. For this purpose, inter alia platform doors are used that are integrated into walls that are often embodied from glass and separate the platform of a stopping point from the region of the rails. In this manner, people are prevented from falling into the path of the vehicle or onto the track. The use of such protective measures however means that when a vehicle is stopped, the vehicle doors of said vehicle must be brought into as precise an alignment as possible with the platform doors, since a rapid and safe exchange of passengers may only take place in this manner.

The stopping point accuracy that is sought after for this purpose currently allows deviations of approximately 10 cm to approximately 30 cm. If the vehicle doors are not brought sufficiently into alignment with the platform doors, the passage for the exchange of passengers is thus narrowed and as a consequence this may lead to a crush among the passengers culminating in a panic reaction in the same passengers. As a result of this, injuries or even possibly deaths may occur.

BRIEF SUMMARY OF THE INVENTION

The object is therefore to provide an improved procedure for detecting the stopping point accuracy, which is achieved during operation of a rail-bound vehicle, or for detecting deviations that occur with regard to the stopping point accuracy and as a consequence to render it possible to optimize the stopping point accuracy by way of an automated correction of the braking curve of a vehicle. As a consequence, it is to be possible using signal technology to realize a stopping point accuracy of 10 cm or less.

In accordance with the invention, an apparatus for detecting and optimizing the stopping point accuracy of a vehicle, comprising at least one sensor unit that may be arranged on the vehicle and at least one evaluating unit that is connected to the at least one sensor unit. The at least one sensor unit is embodied so as to measure a gap relative to a gap profile that is arranged on a stopping point that the vehicle travels to and also so as to transmit the measurement result to the at least one evaluating unit that is connected to the sensor unit.

In accordance with the invention, a system is provided for detecting and optimizing the stopping point accuracy of a vehicle, said sensor arrangement comprising at least one sensor unit that is arranged on the vehicle, at least one gap profile that is arranged on a stopping point that the vehicle travels to and at least one evaluating unit that is connected to the at least one sensor unit. In accordance with the invention, the at least one sensor unit is embodied so as to measure the gap with respect to the at least one gap profile and so as to transmit the measurement result to the at least one evaluating unit that is connected to the sensor unit.

The solution in accordance with the invention has the advantage that by way of an evaluation of analogue measurement values, which result from a measurement of the gap from a sensor unit to a corresponding gap profile that is mounted on the track side, it is possible using signal technology to reliably detect the absolute stopping point accuracy that is achieved during operation.

As a consequence, it is moreover rendered possible to optimize the stopping point accuracy by way of the automated correction of the braking curve for the vehicle.

Dynamic tests during commissioning are furthermore reduced by means of such an automated procedure of identifying the stopping point, which is rendered possible by the system in accordance with the invention. Moreover, the invention offers advantages in the location synchronization or in the distance detection for a vehicle since for example a wheel diameter of the vehicle that reduces over the time may be identified owing to a changed stopping point accuracy and may be automatically compensated by adapting the braking curve for the vehicle.

In accordance with one advantageous embodiment of the system in accordance with the invention, it is provided that the at least one sensor unit that is arranged on the vehicle comprises two sensors for the gap measurement. Sensors of this type that are provided for a gap measurement are capable of detecting objects embodied from different materials such as metal, wood or synthetic material. Moreover, environmental influences such as moisture, dust and smoke do not impair the measuring accuracy of said sensors. Furthermore, precipitation such as rain or snow in normal density also does not lead to impairment of the functions of the sensors with the result that it is also possible to use said sensors at stopping points above ground. Furthermore, it is optionally possible by way of constructive measures to provide an installation that is protected against environmental influences.

Advantageously, furthermore an arrangement of the at least one sensor unit is provided below a door of the vehicle. As a consequence, it is rendered possible, in particular in the case of stopping points that have a ground level entrance and exit, to arrange the sensor unit that is arranged below the door at the same height as the corresponding gap profile that is fastened to the platform of the stopping point.

In accordance with the invention, alternatively or in addition thereto an arrangement of the at least one sensor unit may be provided on the underside of the vehicle and an arrangement of the at least one gap profile may be provided in the track 19. As a consequence, a redundancy and an increased safety that results from this redundancy are achieved during the procedure of detecting the stopping point accuracy of a vehicle. Advantageously, it is moreover possible to provide a validation of the measurement results, which are detected by multiple sensor units, by means of a plausibility check. As a consequence, it is possible to identify defective sensor units.

It is particularly preferred that at least two sensors for the gap measurement and also an evaluating unit that is connected to said sensors are provided on the vehicle. As a consequence, it is not only detected whether the vehicle has come to a standstill at the stopping point or has missed the stopping point but rather it is rendered possible to determine to what extent deviations occur with respect to the optimal stopping point.

Advantageously, each side of the vehicle moreover is provided with at least two evaluating units and also sensor units that are connected to said evaluating units. As a consequence, in accordance with the invention a reliable realization is rendered possible using signal technology, said realization ensuring a function of the system even in the case of a defect of one of the evaluating units or one of the sensor units.

In accordance with a preferred embodiment of the system in accordance with the invention, an evaluating unit and also a sensor unit that is connected to said evaluating unit are provided both on the first door as well as on the last door on each side of the vehicle. It is therefore possible to perform a plausibility check as to whether the entire vehicle, in other words over its entire length, is standing at the platform of a stopping point. Furthermore, it is possible to perform a plausibility check as to which side the platform is located on and whether consequently the doors may be released for opening.

In one further preferred variant of the invention, the at least one evaluating unit is integrated into a train safety computer of the vehicle. This has the advantage that the train safety computer, by way of example an automatic train protection (ATP) device, has a communications interface to a facility for controlling the train, by way of example an automatic train operation (ATO) device, and there is thus the possibility of handing over the required correcting values for the braking curve in relation to the stopping point accuracy directly from the train safety computer to the train control system.

The at least one evaluating unit of the system in accordance with the invention advantageously has means for the automated correction of the braking curve of the vehicle. In this case, the means may be provided as a microprocessor, by way of example within the scope of an integrated circuit. As a consequence, it is rendered possible that not only a stopping point accuracy is detected but rather also that an optimizing procedure is performed in relation to the detection of the stopping point accuracy in that the braking curve for the vehicle is modified taking into account the stopping point accuracy that is determined.

Advantageously, the at least one evaluating unit moreover has means for transmitting the values with regard to the automated correction of the braking curve of the vehicle to a control facility of the vehicle. In this case, the means may be embodied as a wireless or wire-connected communications interface. This is in particular advantageous for the case that the evaluating unit is not integrated into the train safety computer since in this manner it is nevertheless possible to perform an automated optimizing procedure of the braking curve of the vehicle.

In accordance with a further preferred embodiment of the invention, the at least one gap profile has the shape of a rectangle, a triangle or a trapezoid. In the case of a gap profile having the shape of a rectangle, it is therefore rendered possible to detect whether the vehicle has come to a standstill at the stopping point taking into account the permissible deviations or whether said vehicle has missed the stopping point. In the case of a gap profile having the shape of a triangle it is further rendered possible that the deviations with respect to the optimal stopping point may also be detected. A gap profile having the shape of a trapezoid moreover renders it possible that in the case of a sufficiently precise stopping point of the vehicle, it is not necessary to perform any permanent corrections of the vehicle position.

It is preferred that the at least one gap profile is embodied from an in particular curved sheet metal, a synthetic material body or a concrete molded part. Gap profiles that are embodied from materials of this type are simple to produce and are nevertheless suitable for a gap measurement by means of the sensor unit, in particular by means of a sensor unit that comprises two ultrasonic sensors.

In a further preferred embodiment, the at least one gap profile is embodied in a stepped manner on its surfaces that extend obliquely. This embodiment offers the advantages in the case of the gap measurement being performed by the at least one sensor unit, since sometimes sensors that may detect smooth oblique surfaces poorly are used for the gap measurement.

Moreover, a vehicle having an apparatus in accordance with the invention is proposed.

The above-described characteristics, features and advantages of this invention and also the manner in which these are achieved become more clearly and obviously understandable in conjunction with the following description of the exemplary embodiments that are further explained in conjunction with the drawings. In the drawings:

BRIEF DESCRIPTION OF THE SEVERAL VIEWS OF THE DRAWING

FIG. 11 shows a first exemplary embodiment for a gap measurement by means of a first and a second sensor and a gap profile in a trapezoid shape, FIG. 12 shows a second exemplary embodiment for a gap measurement by means of a first and a second sensor and a gap profile in a trapezoid shape, FIG. 13 shows a third exemplary embodiment for a gap measurement by means of a first and a second sensor and a gap profile in a trapezoid shape, FIG. 14 shows a fourth exemplary embodiment for a gap measurement by means of a first and a second sensor and a gap profile in a trapezoid shape, FIG. 15 shows a fifth exemplary embodiment for a gap measurement by means of a first and a second sensor and a gap profile in a trapezoid shape, FIG. 16 shows a first exemplary embodiment of a gap profile in a trapezoid shape, FIG. 17 shows a second exemplary embodiment of a gap profile in a trapezoid shape.

DETAILED DESCRIPTION OF THE INVENTION

The apparatus in accordance with the invention for detecting the stopping point accuracy of a vehicle 1 is explained below. The vehicle 1 in accordance with the invention is in this case, as illustrated in the figures in an exemplary manner, preferably but not limiting a rail-bound vehicle 1, which moves on a track 19 that comprises rails 20.

Figure 1:
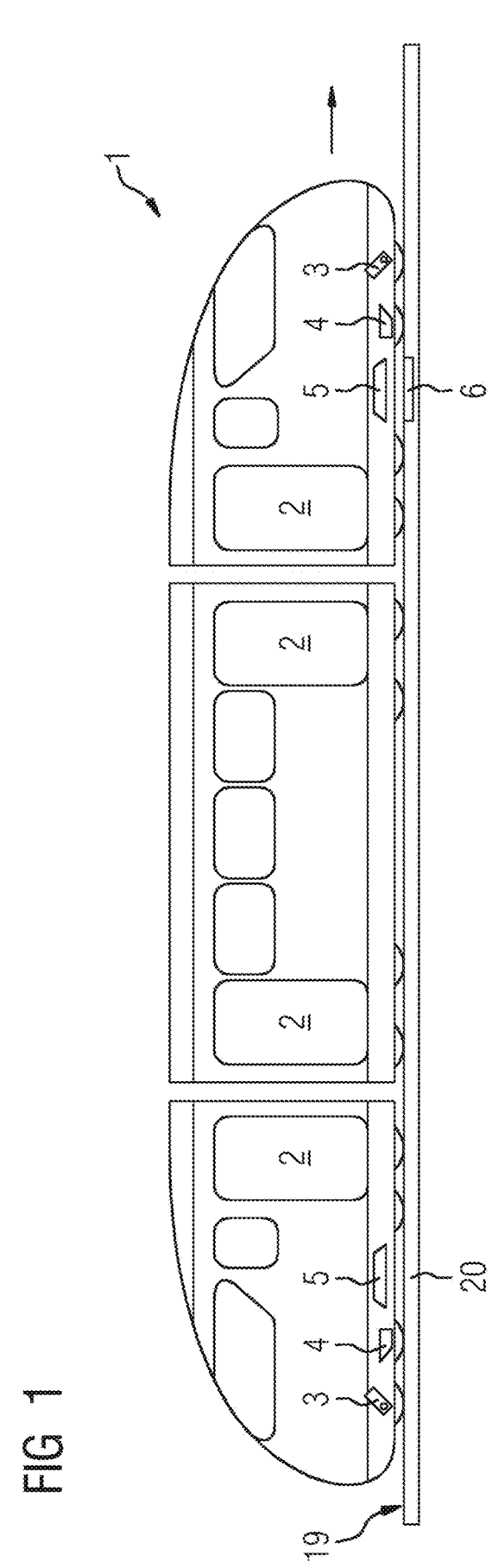
FIG. 1 shows an apparatus that is known from the prior art for detecting the stopping point accuracy of a vehicle.

FIG. 1 illustrates an apparatus that is known from the prior art for detecting the stopping point accuracy of a vehicle 1 in which two odometer pulse generators 3, two radar devices 4 and also two balise antennae 5 are provided. The vehicle 1 is preferably a rail-bound vehicle 1, which moves on rails 20 that are a component of a track 19. In this case, a location synchronization is realized using the point-shaped balise transmitting channel, which is formed between the balise antennae 5 of the vehicle 1 and the track-side fixed data Balise 6 that is preferably arranged in the track 19. Moreover, the distance traveled is calculated via the known wheel circumference by means of the odometer pulse generators 3. The vehicle 1 is brought to a standstill at the stopping point via an engagement of the brakes. The possible deviations of the balise center identification for the location synchronization, an erroneous distance-traveled value as a result of the wheels possibly sliding during a braking procedure and inaccuracies in the wheel circumference play an important role for the calculation of the stopping point accuracy. From a safety technical point of view, it is hitherto therefore permissible to only realize stopping point accuracies up to approximately 1 m. Moreover, the absolute stopping point accuracies that are achieved during operation or the deviations that occur during this operation are not detected. Furthermore, it is also not possible to optimize the stopping point by way of automated correction of the braking curve of the vehicle. Sensor weaknesses of the radar sensors are only to be taken into account when using additional radar sensors for calculating the distance traveled which is why in this case it is also not possible to obtain a satisfactory result with regard to the stopping point accuracy.

Figure 2:
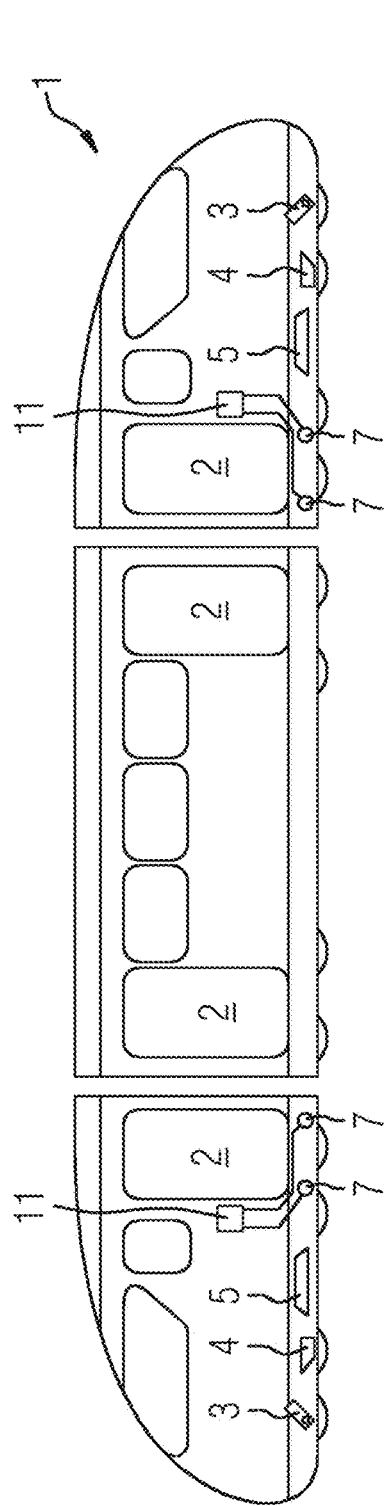
FIG. 2 shows a vehicle according to the system in accordance with the invention illustrated in a side view.

FIG. 2 illustrates a rail-bound vehicle 1 that is illustrated in a side view and a track 19 that comprises a rail 20 is traveled on using said vehicle, according to the system in accordance with the invention, said rail-bound vehicle respectively comprising a sensor unit 7 that is arranged below the two outer doors 2, said sensor unit being respectively connected to an evaluating unit 11. The sensor units 7 that are attached to the vehicle 1 for detecting the absolute stopping accuracy are required for the gap measurement and may comprise by way of example ultrasonic sensors. In the present case, two Balises 5, two odometer pulse generators 3 and two radar devices 4 may be provided for a rough locating procedure of the vehicle 1 and the actual functions of train safety remain the same.

Figure 3:
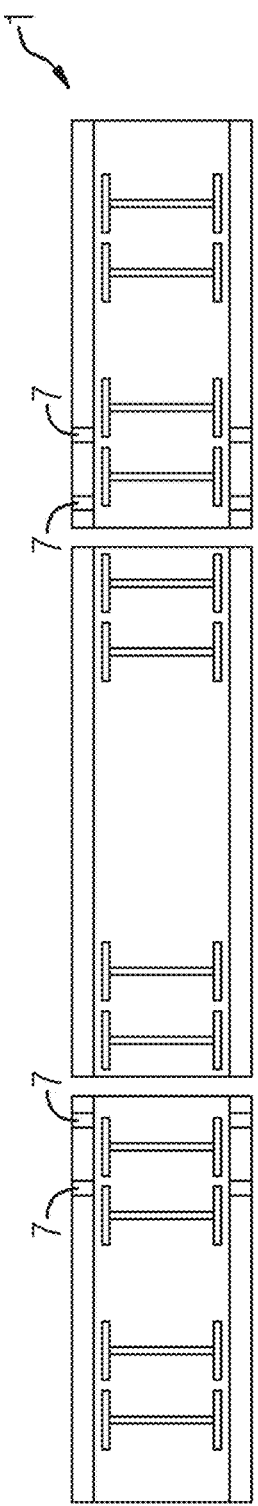
FIG. 3 shows a vehicle according to the system in accordance with the invention in an underside view.

FIG. 3 illustrates the rail-bound vehicle 1 in an underside view which is why it is apparent that the sensor units 7 are arranged respectively on the two sides of the vehicle 1 in the region of the two outer doors.

Figure 4:
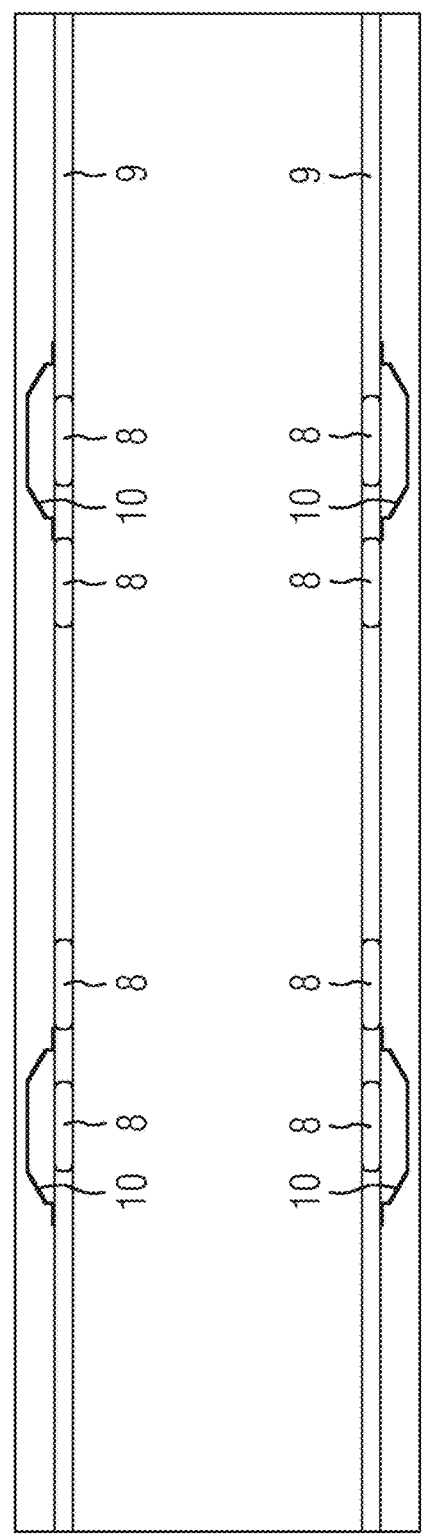
FIG. 4 shows a stopping point according to the system in accordance with the invention.

Moreover, FIG. 4 illustrates a stopping point that is fitted out in a manner according to the present invention and comprises a platform that has gap profiles 10 on the platform side below the platform doors and at the same height of the sensor units 7 of the vehicle 1. The gap profiles in this case are arranged in such a manner that they may be detected by the sensor units 7 that are arranged on the two outer doors 2 of the vehicle 1. Moreover, in FIG. 4 eight doors 8 are visible at the stopping point, said doors being integrated at the stopping point into a surrounding wall 9 that is preferably embodied from glass and it is rendered possible for passengers to enter the vehicle 1 through said doors. Two of the sensor units 7, which are allocated to a door 2, respectively provide two independent analogue values, by way of example a voltage value and/or current value, to an evaluating unit 11 so as to evaluate and to determine the gap a1, a2 between a sensor unit and a gap profile 10. The height of the output value in this case is proportional to the gap a1, a2. In the present case, two evaluating units 11 are required on each side of the vehicle 1 for a reliable realization using signal technology.

The gap profile 10 and the two sensors 12, 13 are described below, which render it possible to detect the absolute stopping point accuracy that is achieved during operation and to optimize the stopping point.

Figure 5:
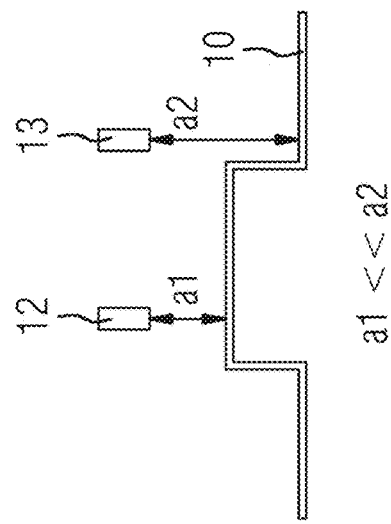
FIG. 5 shows a first exemplary embodiment for a gap measurement by means of a first and a second sensor and a gap profile in a rectangular shape.

FIG. 5 illustrates a first exemplary embodiment for a gap measurement by means of a first and a second sensor 12, 13 and a gap profile 10 in a rectangular shape. The shape of a rectangle for the gap profile 10 renders it possible only to detect whether the vehicle 1 has come to a standstill at the stopping point or whether said vehicle has missed the stopping point. In FIG. 5, it is apparent that the two sensors 12, 13 detect the protruding region of the gap profile 10. The result of this is that the vehicle 1 has come to a standstill at the stopping point in such a manner that the gap profile 10 that is arranged in the region of a door 8 at the stopping point is opposite the two sensors 12, 13 that are arranged in the region of the door 2 of the vehicle 1, which results in two gaps a1, a2 of equal size between the protruding region of the gap profile 10 and the sensors 12, 13. The stopping point was accordingly reached in an optimal manner.

Figure 6:
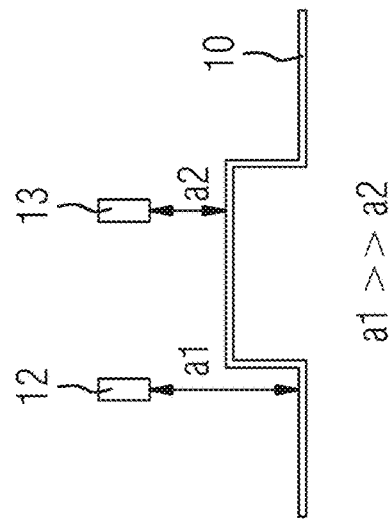
FIG. 6 shows a second exemplary embodiment for a gap measurement by means of a first and a second sensor and a gap profile in a rectangular shape.

FIG. 6 illustrates a second exemplary embodiment for a gap measurement by means of a first and a second sensor 12, 13 and a gap profile 10 in a rectangular shape in which the vehicle 1 has reached the stopping point too early, in other words has come to a standstill too early. In comparison to the second sensor 13, the first sensor 12 has a greater gap a1 with respect to the gap profile 10. Only the gap a2 from the second sensor 13 with respect to the gap profile 10 has the desired value.

Figure 7:
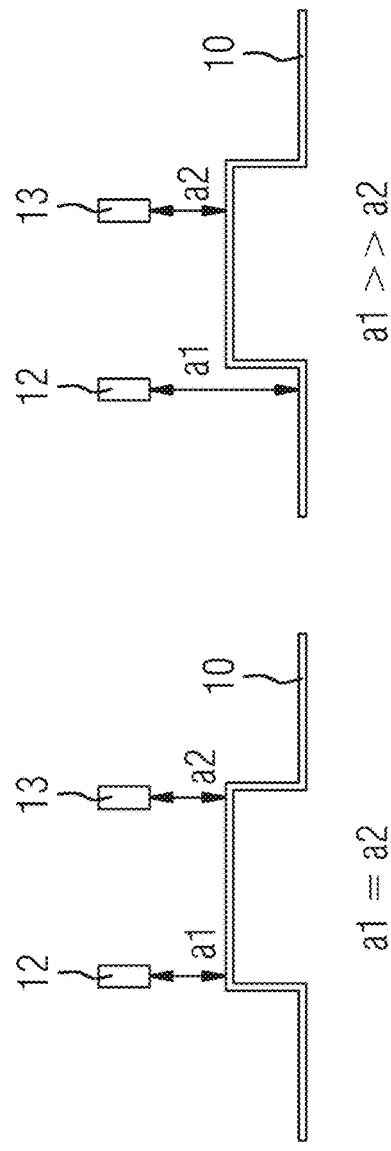
FIG. 7 shows a third exemplary embodiment for a gap measurement by means of a first and a second sensor and a gap profile in a rectangular shape.

FIG. 7 illustrates a third exemplary embodiment for a gap measurement by means of a first and a second sensor 12, 13 and a gap profile 10 in a rectangular shape in which the vehicle 1 has reached the stopping point too late, in other words has come to a standstill too late. Here, in comparison to the first sensor 12, the second sensor 13 has a greater gap a2 with respect to the gap profile 10. The gap a1 from the first sensor 12 with respect to the gap profile 10 conversely has the desired value.

Figure 8:
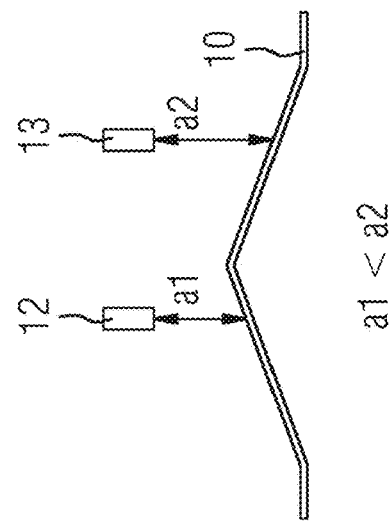
FIG. 8 shows a first exemplary embodiment for a gap measurement by means of a first and a second sensor and a gap profile in a triangular shape.

FIG. 8 illustrates a first exemplary embodiment for a gap measurement by means of a first and a second sensor 12, 13 and a gap profile 10 in a triangular shape. It is also rendered possible by way of the triangular shape to detect deviations with respect to the optimal stopping point. In the case of the exemplary embodiment that is illustrated in FIG. 8, the stopping point has been reached by the vehicle 1 in an optimal manner, in other words the vehicle 1 has come to a standstill neither too early nor too late. A case of this type in which the gap between the first sensor and the gap profile 10 and also the second sensor and the gap profile 10 coincides exactly with a1=a2, will not occur in reality since small differences between a1 and a2 cannot be ruled out.

Figure 9:
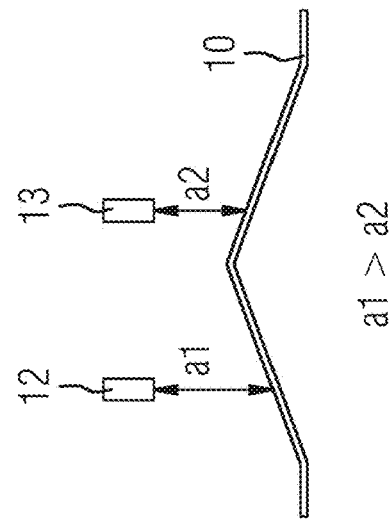
FIG. 9 shows a second exemplary embodiment for a gap measurement by means of a first and a second sensor and a gap profile in a triangular shape.

FIG. 9 illustrates a second exemplary embodiment for a gap measurement by means of a first and a second sensor 12, 13 and a gap profile 10 in a triangular shape in which the stopping point has been reached too early, in other words the vehicle has come to a standstill too early. The gap a1 of the first sensor 12 with respect to the gap profile 10 is greater than the gap a2 of the second sensor 13 with respect to the gap profile 10. In the present case, the braking curve of the vehicle 1 should be corrected in that the braking curve is modified to the effect that the vehicle 1 brakes later and/or less intensely and as a consequence travels further with the result that a position is reached in which the two gaps a1 and a2 of the sensors 12, 13 from the gap profile 10 approximately coincide.

Figure 10:
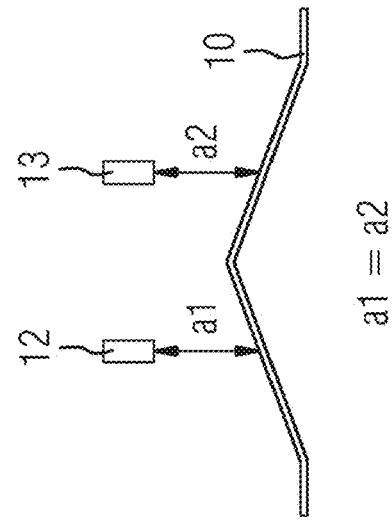
FIG. 10 shows a third exemplary embodiment for a gap measurement by means of a first and a second sensor and a gap profile in a triangular shape.

FIG. 10 illustrates a third exemplary embodiment for a gap measurement by means of a first and a second sensor 12, 13 and a gap profile 10 in a triangular shape in which the stopping point has been reached too late, in other words the vehicle has come to a standstill too late. The gap a2 of the second sensor 13 with respect to the gap profile 10 is greater than the gap a1 of the first sensor 12 with respect to the gap profile 10. In the present case, the braking curve of the vehicle 1 should be corrected in that the braking curve is modified to the extent that the vehicle 1 brakes earlier and/or more intensely and as a consequence does not travel as far with the result that a position is reached in which the two gaps a1 and a2 of the sensors 12, 13 from the gap profile 10 approximately coincide.

FIG. 11 illustrates a first exemplary embodiment for a gap measurement by means of a first and a second sensor 12, 13 and a gap profile 10 in a trapezoid shape. A gap profile in a trapezoid shape is used in order to prevent non-permanent corrections of the braking curve of the vehicle 1 being required in the case of a sufficiently precise stopping point, since the gaps a1, a2 that are measured by the two sensors 12, 13 do not coincide. In this case, the different sections of the trapezoid are allocated value ranges 14, 15, 16, 17, 18, which make a statement regarding the accuracy of the stopping point. In FIG. 11, the two sensors 12, 13 determine a measuring value in the value range 14, which results in the stopping point being adhered to particularly precisely and that a correction of the vehicle braking curve is not required. The doors 2 of the vehicle 1 and the platform doors 8 may be opened in the case of a vehicle being at a standstill. Provided therefore that the two sensors 12, 13 are in the value range 14, the stopping point has been reached particularly precisely by the vehicle 1, with the result that the doors 2 of the vehicle 1 may be opened and a correction or calibration of the braking curve of the vehicle 1 is not required.

FIG. 12 illustrates a second exemplary embodiment for a gap measurement by means of a first and a second sensor 12, 13 and a gap profile 10 in a trapezoid shape. In this case, the first sensor 12 is in the value range 15 and the second sensor is in the value range 14. This means that the stopping point is still sufficiently precise with the result that the doors 2 of the vehicle 1 may open when the vehicle 1 is at a standstill. However, a correction or calibration of the braking curve of the vehicle 1 should be performed so that the vehicle 1 in future brakes later and/or less intensely and as a consequence travels further with the result that a position is reached in which the two sensors 12, 13 obtain a measurement value in the value range 14.

FIG. 13 illustrates a third exemplary embodiment for a gap measurement by means of a first and a second sensor 12, 13 and a gap profile 10 in a trapezoid shape. In this case, the second sensor 13 is in the value range 16 and the first sensor is in the value range 14. This means that the stopping point is still sufficiently precise with the result that the doors 2 of the vehicle 1 may open when the vehicle 1 is at a standstill. However, a correction or calibration of the braking curve of the vehicle 1 should be performed so that the vehicle 1 in future brakes earlier and/or more intensely and as a consequence does not travel as far with the result that a position is reached in which the two sensors 12, 13 obtain a measurement value in the value range 14. Provided therefore that one of the sensors 12, 13 is in the value range 15 or 16 and the other sensor 12, 13 is in the value range 14, the stopping point of the vehicle 1 has namely still been reached sufficiently precisely but a correction or calibration of the braking curve of the vehicle 1 is to be performed.

FIG. 14 illustrates a fourth exemplary embodiment for a gap measurement by means of a first and a second sensor 12, 13 and a gap profile 10 in a trapezoid shape. In this exemplary embodiment, the vehicle 1 has reached the stopping point far too early with the result that the first sensor 12 is in the value range 17 and the second sensor is in the value range 14. In the present case, the stopping point has no longer been reached sufficiently precisely with the result that the vehicle may not open the doors 2 in this position. The vehicle must therefore change its position in such a manner that at least one sensor 12, 13 is in the value range 14 and the other sensor 12, 13 is in the value range 15 or 16 so that the doors 2 of the vehicle 1 may be opened. Moreover, a correction or calibration of the braking curve of the vehicle 1 must be performed so that the vehicle 1 in future brakes later and/or less intensely and as a consequence travels further with the result that a position is reached in which the first sensor 12 is not allocated a measurement value in the value range 17.

FIG. 15 illustrates a fifth exemplary embodiment for a gap measurement by means of a first and a second sensor 12, 13 and a gap profile 10 in a trapezoid shape. In this exemplary embodiment, the vehicle 1 has reached the stopping point far too late with the result that the first sensor 12 is in the value range 14 and the second sensor is in the value range 18. In the present case, the stopping point has no longer been reached sufficiently precisely with the result that the vehicle 1 may not open the doors 2 in this position. The vehicle 1 must therefore change its position in such a manner that at least one sensor 12, 13 is in the value range 14 and the other sensor 12, 13 is in the value range 15 or 16 so that the doors 2 of the vehicle 1 may be opened. Moreover, a correction or calibration of the braking curve of the vehicle 1 must be performed so that the vehicle 1 in future brakes earlier and/or more intensely and as a consequence does not travel as far with the result that a position is reached in which the second sensor 13 is not allocated a measurement value in the value range 18. Provided therefore that at least one sensor 12, 13 is in the value range 17 or 18, the stopping point has no longer been reached sufficiently precisely by the vehicle 1, with the result that the doors 2 of the vehicle 1 may not be opened and moreover a correction or calibration of the braking curve of the vehicle 1 is required.

FIG. 16 illustrates a first exemplary embodiment of a gap profile 10 in a trapezoid shape in which the ascending and the descending flanks of the gap profile 10 that is embodied as a trapezoid have a straight extent. An extent of this type has the advantage that the gap profile 10 is simple to produce. However, the straight extent could sometimes lead to the fact that owing to the smooth surface the sensor of the sensor unit that is provided for the detection of the gap may perform an incorrect detecting procedure.

FIG. 17 illustrates a second exemplary embodiment of a gap profile 10 in a trapezoid shape in which the ascending and the descending flanks of the gap profile 10 that is embodied as a trapezoid has a stepped extent. An extent of this type has the advantage that it is possible to use more cost-effective sensors of the sensor unit which sometimes have problems with the detection of smooth oblique surfaces.

Accordingly, an evaluation is performed by way of the system in accordance with the invention by way of analogue measurement values that are detected by means of gap measurement by sensors 12, 13, as a result of which a reliable detection of the absolute stopping point accuracy that is achieved during operation and an optimizing procedure of the stopping point accuracy is rendered possible using signal technology by way of an automated correction of the braking curve.

Although the invention has been further illustrated and described in detail by way of preferred exemplary embodiments, the invention is not limited in this manner by the examples that are disclosed and other variations may be derived therefrom by the person skilled in the art without departing from the protective scope of the invention.

The invention claimed is:

1. A system for ascertaining and optimizing a stopping point accuracy of a rail-bound vehicle, the system comprising:
   at least one sensor unit arranged on the rail-bound vehicle;
   at least one gap profile arranged at a stopping point towards which the vehicle travels;
   at least one evaluating unit connected to said at least one sensor unit;
   said at least one sensor unit including two sensors each being configured to measure a spacing distance from said at least one gap profile, the spacing distance being measured in a direction perpendicular to a travel direction of the rail-bound vehicle, and to transmit a measurement result with the respective spacing distance to said at least one evaluating unit; and
   said at least one gap profile being disposed:
      on a rail that is traveled on by the vehicle or on a track adjacent the rail, wherein a vertical gap between each of said sensors of said sensor unit and said gap profile is measured; or
      on a surrounding wall adjacent the vehicle and located at the stopping point, wherein a horizontal gap defined by the spacing distance in a transverse direction perpendicular to a travel direction of the vehicle between each of said sensors of said sensor unit and said gap profile is measured; and
   said at least one evaluating unit being configured to compare the vertical gaps measured by the two sensors to one another or to compare the horizontal gaps measured by the two sensors to one another and, if the vertical gaps or the horizontal gaps are identical, to conclude that the rail-bound vehicle has accurately stopped at a desired stopping point.

2. The system according to claim 1, wherein said at least one sensor unit on said vehicle comprises at least two sensors for measuring the spacing distance.

3. The system according to claim 1, wherein said at least one sensor unit is disposed below a door of the vehicle.

4. The system according to claim 1, wherein said at least one evaluating unit is one of at least two evaluating units arranged on selected sides and said at least one sensor unit is one of a plurality of sensor units connected to said evaluating units on the vehicle.

5. The system according to claim 4, wherein each side of the vehicle is provided with at least two evaluating units and also sensor units that are connected to said evaluating units.

6. The system according to claim 1, wherein an evaluating unit and also a sensor unit that is connected to said evaluating unit are provided both on a first door and on a last door on each side of the vehicle.

7. The system according to claim 1, wherein the vehicle is a train and said at least one evaluating unit is integrated into a train safety computer of the vehicle.

8. The system according to claim 1, wherein said at least one evaluating unit is configured for an automated correction of a braking curve of the vehicle.

9. The system according to claim 8, wherein said at least one evaluating unit is configured for transmitting values concerning the automated correction of the braking curve of the vehicle to a control facility of the vehicle.

10. The system according to claim 1, wherein said at least one gap profile has a shape selected from the group consisting of a rectangle, a triangle, and a trapezoid.

11. The system according to claim 1, wherein said at least one gap profile is a structure selected from the group consisting of curved sheet metal, a synthetic material body, and a concrete molded part.

12. The system according to claim 1, wherein said at least one gap profile is formed with steps on obliquely extending surfaces thereof.

13. A method of ascertaining and optimizing a stopping point accuracy of a rail-bound vehicle, the method comprising:
   providing a sensor unit with two sensors on the rail-bound vehicle and an evaluating unit connected to the sensor unit;
   providing at least one gap profile at a stationary stopping point towards which the vehicle travels, the at least one gap profile being disposed on a rail that is traveled on by the vehicle or on a track adjacent the rail or the track profile being disposed on a surrounding wall adjacent the vehicle at the stopping point; and
   measuring with each of the sensors of the sensor unit a spacing distance from the at least one gap profile and transmitting a measurement result with the spacing distance from each of the sensors to the evaluating unit, the measuring step comprising:
      measuring a vertical spacing distance between each of the sensors and the gap profile on the rail or on the track adjacent the rail, the vertical spacing distance being measured in a direction perpendicular to a travel direction of the rail-bound vehicle; or
      measuring a horizontal spacing distance between each of the sensors and the gap profile on the surrounding wall adjacent the vehicle at the stopping point, the horizontal spacing distance being measured in a transverse direction perpendicular to a travel direction of the vehicle; and
   comparing with the evaluating unit the vertical gaps measured by the two sensors to one another or comparing the horizontal gaps measured by the two sensors to one another and, if the vertical gaps or the horizontal gaps are identical, concluding that the rail-bound vehicle has accurately stopped at the stopping point.

* * * * *